Nov. 23, 1937.  H. HANDREK  2,100,187

ENTRANCE INSULATION FOR ELECTRICAL CONDUCTORS

Filed Feb. 4, 1935   3 Sheets-Sheet 1

Inventor
Hans Handrek

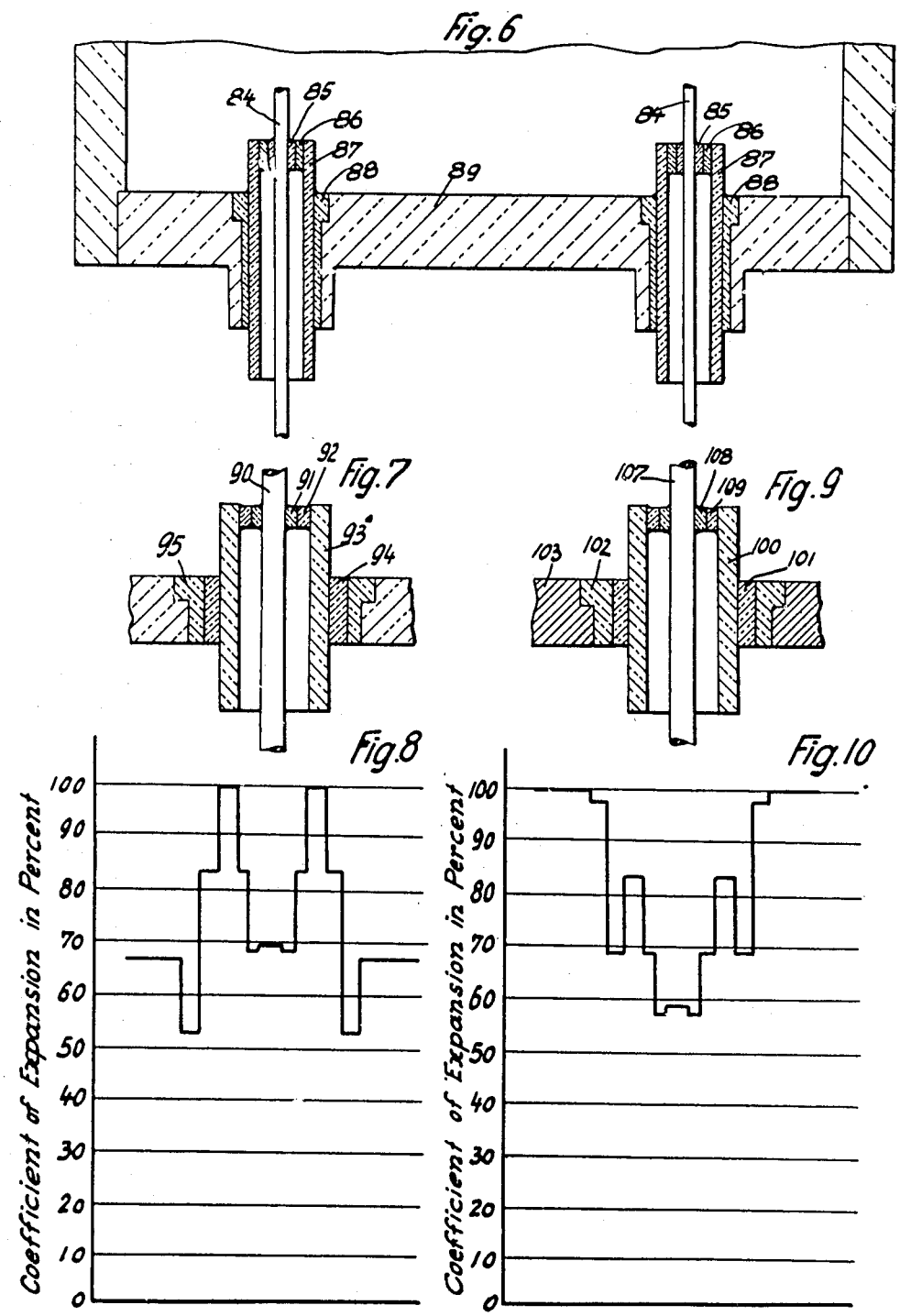

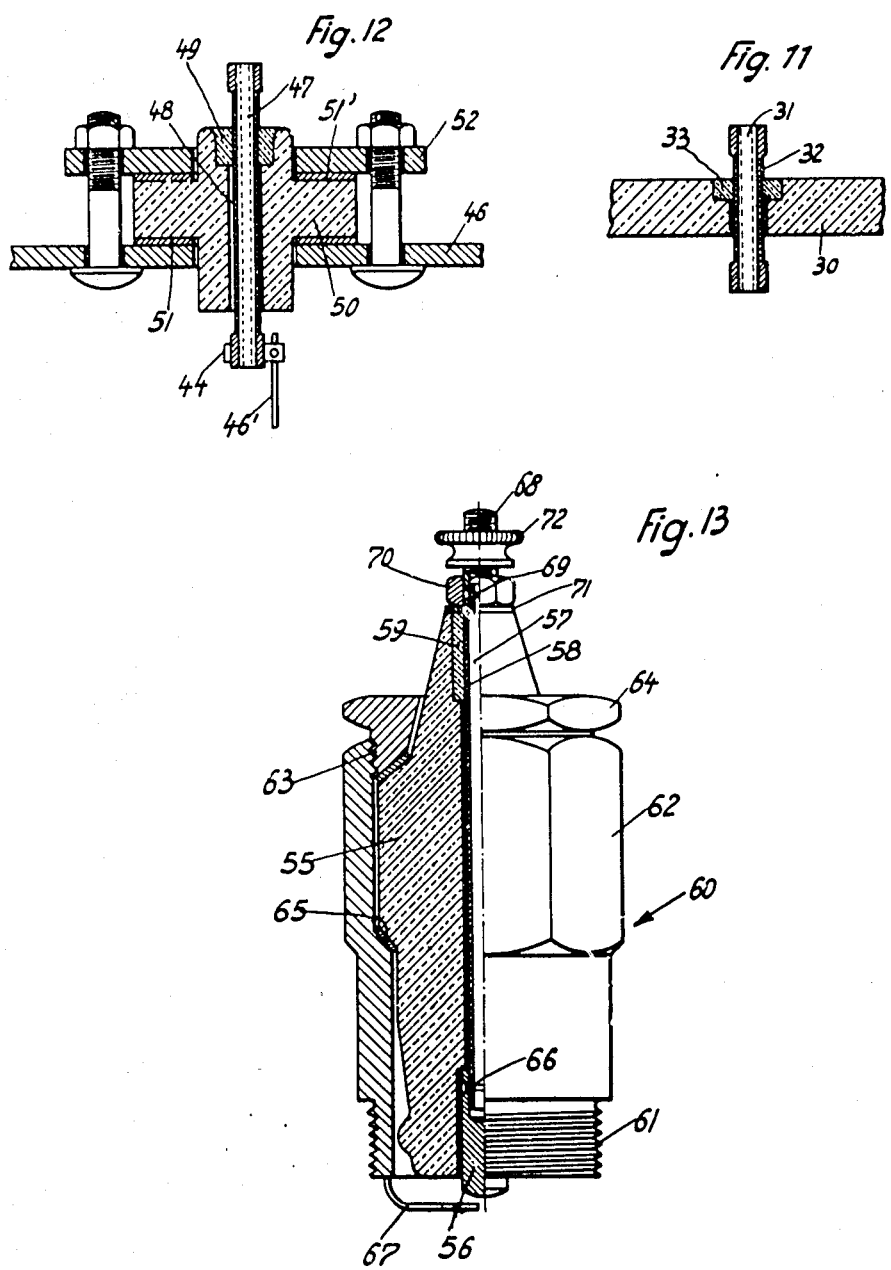

Patented Nov. 23, 1937

2,100,187

UNITED STATES PATENT OFFICE 2,100,187

ENTRANCE INSULATION FOR ELECTRICAL CONDUCTORS

Hans Handrek, Bad Klosterlausnitz, Germany, assignor to Porzellanfabrik Kahla, Kahla, Germany Application February 4, 1935, Serial No. 4,858
In Germany December 27, 1933

9 Claims. (Cl. 173—311)

My invention relates to an improved entrance insulation of an electrical conductor.

The objects of my invention are a means for sealing the passage of an electrical conductor through an insulating element of an inorganic insulating material, more particularly through the wall of a chamber, such as an electric cell or the like, and the provision of an improved gastight entrance insulation which may be cheaply produced and is capable of withstanding mechanical and thermal stresses without losing its gastight character.

My invention is primarily applicable to the manufacture of radio tubes and other vacuum cells including electrodes which are connected to conductors passing through the wall of the tube made of glass or porcelain or a similar inorganic insulating material, but is also applicable to structures in other arts, for instance to spark plugs.

Prior to my invention it was customary to employ conductors in the form of wire, strip, tube or rod passing through the insulating member or wall of glass, quartz or the like and sealed therein either by a fusing process or by packing material. Considerable difficulties were experienced in the fusing process due to the different coefficients of thermal expansion of the conductor and the insulating material through which the conductor passes.

For these reasons, it was not possible, for instance, to produce a satisfactory entrance insulation by a fusing process of coaxially arranged tubular conductors of considerable diameter, although such an arrangement of the conductors is highly desirable in radio tubes for short wave lengths.

A further object of my invention is the provision of entrance insulation of a plurality of tubular conductors arranged in nested relation passing through a wall of an inorganic insulating material, such as glass, quartz, porcelain and other ceramic materials used in the electrical art, more particularly, in high frequency apparatus.

I have found that the difficulties arising from the difference in the coefficients of thermal expansion may be avoided by the use, in the passage of a conductor through an inorganic insulating element, of a conductor formed by a conductive film deposited on a carrier member of an inorganic insulating material similar to the material of the insulating element. Thus, the conductor may consist of a metallic film deposited on a tubular or rod-shaped ceramic member, the film being covered by a glaze, which, by a fusing process, may be easily united with the material of the wall or other element through which the carrier member passes.

Moreover, I have found that the glaze uniting the conductive member, that is to say the carrier member provided with the metallic film, with the surrounding insulating material and interposed therebetween, should have a coefficient of thermal expansion from about 10 to 40 percent lower than that of the carrier member and of the surrounding insulating material of the wall or the like.

Another way of avoiding the difficulties arising from the difference between the coefficients of expansion of the conductor and the insulating element through which the latter passes, is to interpose therebetween a plurality of layers of glazes having different coefficients of expansion which are so chosen that the coefficient of the innermost layer differs but slightly from that of the conductor, while the coefficient of the outermost layer differs but slightly from that of the insulating material, the coefficients of the intermediate layers, if such are provided, lying therebetween.

Further objects of my invention will appear from the description following hereinafter of different embodiments illustrated in the drawings, while the features of novelty will be pointed out in the claims.

Fig. 6 is a section through the lower portion of a high vacuum tube in which the conductors connected to the electrodes are provided with an entrance insulation of the type shown in Fig. 4;

Fig. 7 is a view similar to Fig. 4 of a slightly modified entrance insulation;

Fig. 8 is a diagram showing the relative coefficients of thermal expansion of the entrance insulation of Fig. 7;

Figs. 9 and 10 are representations similar to Figs. 7 and 8 of a further example of my improved entrance insulation;

Fig. 11 illustrates in an axial section the entrance insulation of a housing for electrical condensers;

Fig. 12 is an axial section of a conductor passing through the cover of an electrolytic condenser and provided with my improved entrance insulation; and Fig. 13 is an axial section through a spark plug in which the conductor of the central electrode is provided with my improved entrance insulation.

Figure 1:
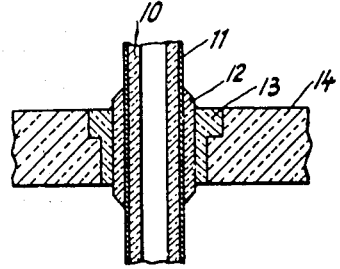
Fig. 1 illustrates an axial section through a tubular conductor passing through a wall of an inorganic insulating material, the conductor being sealed therein by a plurality of layers of fused glaze.

In Fig. 1 I have illustrated the insulation of the point of passage of a conductor 10 through a wall 14 of a ceramic insulating material, for instance the material known on the German market under the trade name "Calit".

Calit is a pure magnesium silicate free from iron, sintered at a temperature of 1300-1400° C. It is far superior to other ceramic materials regarding its factor of dielectric loss and is, therefore, used for high frequency purposes in preference to other insulating materials.

The conductor 10 is formed by a tubular member, preferably made of the same material as the wall 14, for instance Calit, and provided with a thin film 11 of a conductive material, preferably metal.

Any of the well known methods may be employed for producing the conductive film 11, for instance the burning process employed in the ceramic art for depositing a layer of silver or gold on china ware for ornamental purposes, or the metal spraying process developed by Schoop or a cathode spraying process or electrolysis. It is to be understood, of course, that while the use of a noble metal, such as silver, gold or platinum, will facilitate the burning process if such is employed for depositing the film, any other metal, such as copper, aluminum or the like, may be chosen provided precautions be taken in the burning process to avoid oxidation. The burning process may be carried out, for instance, in a reducing atmosphere free from oxygen.

The film 11 is wholly or in part covered by a thin layer of glaze indicated at 12. The thickness of this layer may amount to .006 inch for instance, while the conductor 10 may have a diameter of a quarter of an inch. For sealing the aperture provided in the wall 14 through which the conductor 10 passes, I employ an enamel flux having a coefficient of thermal expansion which is about 10-40 per cent smaller than the coefficient of thermal expansion of the material of which the carrier member 10 and the wall 14 are made.

After the carrier member 10 has been provided with the conductive film 11 and the layer of glaze 12, it is fixed in a suitable refractory holder relative to the member 14 in the position shown in Fig. 1. The aperture is recessed at the top as shown in Fig. 1 and the flux is brought into this recess in the form of a powder. The refractory holder carrying the two elements 10 and 14 in fixed relative position is then heated in a suitable oven to a temperature at which the powdered flux will fuse and fill the gap left between the layer 12 and the wall of the aperture. This gap may have a width of about .006 inch.

I have found that the use of intermediate layers between the conductor and the wall of a glaze or other flux having a coefficient of expansion, which is higher than that of the wall or the conductor, is liable to produce undesired thermal stresses which impair the mechanical properties of the insulation. Particularly, tensional stresses in the intermediate layers must be avoided and I have found that this object may be readily attained by the use of a glaze or flux having a lower coefficient of expansion than the material of the element or wall through which the conductor passes. In the embodiment shown in Fig. 1 for instance, I may make the layer 12 of a glaze having from 87 to 97 per cent of the coefficient of Calit, while the flux 13 may preferably have a coefficient of heat expansion as low as 80-82 per cent of that of Calit. A great number of glass or glaze compositions are known in the art which have the required characteristics.

I may use, for instance, for the layer 12 a silicate flint glass referred to in the publication "Physikalisch-Chemische Tabellen" by Landolt-Börnstein, Edition of 1923, pages 1220 and 1221, as "O 118" having a coefficient of thermal expansion amounting to $7.3 \times 10^{-6}$, that is to say, 94-96 per cent of that of Calit which has a coefficient varying from 7.6 to $7.8 \times 10^{-6}$.

A composition that may be employed for the flux 13 is the glass known on the German market as "Jenaer Borosilikat-Thermometerglas $59^{III}$" having a coefficient amounting to $6.2 \times 10^{-6}$, that is to say, of 80-82 per cent of that of Calit. This glass has approximately the following composition:

| | Per cent |
|---|---|
| $Al_2O_3$ | 5.0 |
| $B_2O_3$ | 12.0 |
| $SiO_2$ | 71.95 |
| $Na_2O$ | 11.0 |
| $Mn_2O_3$ | 0.05 |

Preferably, the flux 13 should have a lower melting temperature than the glaze 12 so that the glaze 12 will not fuse when the flux 13 is molten. The composition O 118 above referred to has a melting temperature of 800 degrees Celsius, for instance, whereas the composition $59^{III}$ has a melting point of 720 degrees Celsius.

If desired, the conductor 10 could be directly fused into the wall 14 by means of the flux 13 without being previously provided with a glaze 12. The provision of the glaze 12 affords the advantage of a protection of the conductive layer against mechanical injury. If desired, the layers 12 and 13 may be made of the same material.

Figure 2:
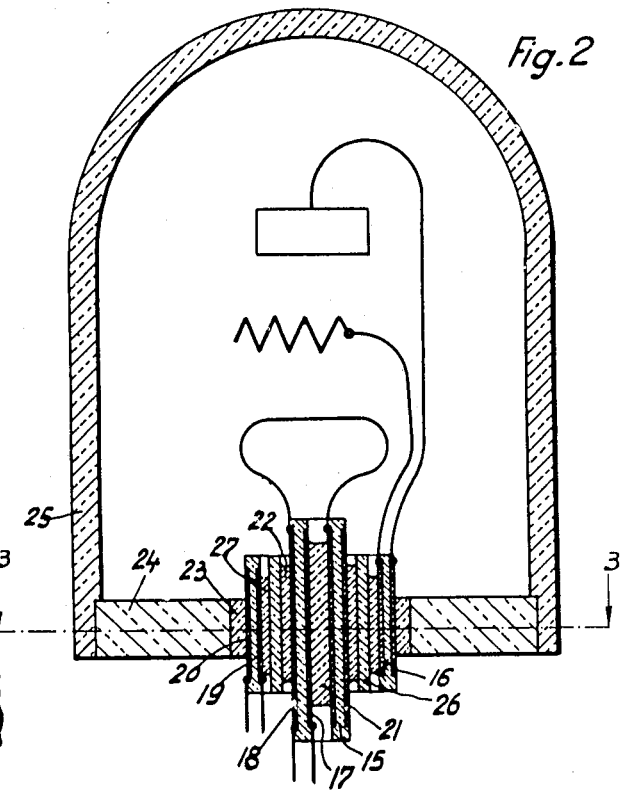
Fig. 2 is an axial section through a high vacuum tube provided with my improved entrance insulation of a plurality of electrode conductors arranged in coaxial relationship.
Figure 3:
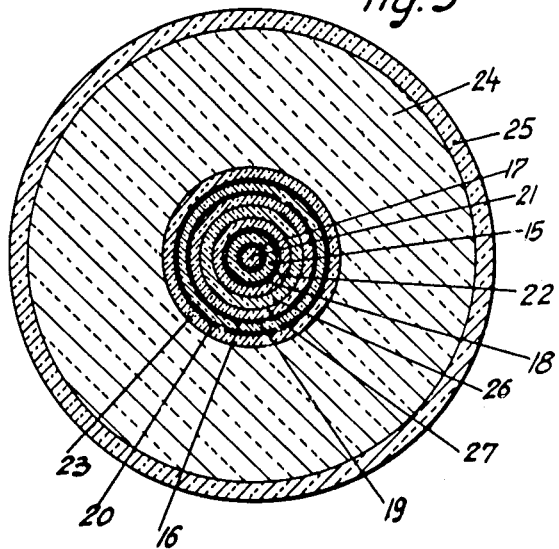
Fig. 3 is the section taken along line 3—3 of Fig. 2.

The use of conductors formed by a ceramic carrier member provided with a conductive film offers particular advantages when applied to discharge tubes for high frequency purposes, as the electrode conductors may be coaxially arranged as illustrated in Figs. 2 and 3. Because of the well known skin-effect this will reduce the electrical resistance of the conductors. Owing to their elasticity the thin conductive films deposited on a ceramic insulating carrier will not set up substantial stresses therein owing to thermal expansion, but will readily follow the expansion and contraction of the carrier or of the surrounding material without exerting any considerable stress thereon, whereas conductors in wire or strip form, such as used prior to my invention, are liable because of their considerable cross-section to break the fused insulating seal, when subject to considerable temperature changes.

A multiple electrode discharge tube according to my invention is shown in Figs. 2 and 3. It comprises a base plate 24 preferably made of Calit and a bulb 25 suitably fixed thereto, for instance by a fused glaze, and consisting of glass, porcelain or any other suitable material. The electrode conductors comprise coaxially arranged tubes 15 and 16 of a suitable inorganic insulating material, for instance also of Calit, each provided with inner and outer conductive films 17, 18 or 19, 20 respectively, which may consist of a suitable metal deposited on their carrier by the above explained burning process. The conductive films 17, 18, 19 and 20 are soldered to suitable wires leading to the different electrodes on the one hand and to suitable terminals on the other hand. An illustration of the socket of the tube carrying these terminals is not deemed necessary as it does not form part of my invention.

The tube 15 is filled with a suitable enamel flux 21 providing for a seal. An insulating tube 26 preferably consisting of the same material as the tubes 15 and 16, for instance of Calit, is interposed between the tubes 15 and 16 in spaced relation thereto. The gap between the three nested tubes is filled by fused enamel fluxes 22 and 27 to provide for a vacuum-proof seal.

The multiple electrode unit comprised of the three tubes 15, 16 and 26 united with each other by the interposed layers of flux, is finally inserted in the aperture provided in the base plate 24 and is sealed therein by the fusible enamel flux 23.

The coefficients of expansion of the flux employed for the layers 21, 22, 27 and 23 are preferably 10 to 40 per cent below the coefficient of thermal expansion of the base 24. Instead of Calit any other ceramic or inorganic insulating material may be employed, for instance glass, quartz, quartz-glass and so on.

My invention is not limited to vacuum-proof entrance insulation, but is also applicable to entrance insulation of conductors extending into chambers containing gas or liquid under high pressure, or requiring a tight seal from the atmosphere. Thus, my invention is applicable to the entrance insulation of the terminal conductors of electrical condensers enclosed in an insulating housing or to the entrance insulation of the central electrode of a spark plug.

In Fig. 11 I have shown the entrance insulation of a conductor passing through the ceramic wall 30 of a housing for electrical condensers. The carrier member 31 of ceramic material which may be in form of a rod or a tube is provided with a conductive film, for instance with a layer of noble metal deposited on its carrier by the burning process which is ordinarily employed in the ceramic art for providing china ware with metallic films for ornamental purposes. The metallic film is provided with a protective glaze covering. The metallic film and the glaze covering are designated by 32 as a whole. The aperture provided in the ceramic wall 30 is recessed at the top and the recess is filled with a suitable flux 33 which is fused to enter the gap left between the wall of the aperture and the carrier member 31 to provide for a vacuum-tight seal. The flux 33 is formed by a suitable glaze or other inorganic compound having a coefficient of thermal expansion amounting to but 60-90 per cent of the coefficient of the material of which the wall 30 and the carrier member 31 are made. The conductive film 32 is made thicker at its ends as indicated at 34 and 35 to permit the attachment of conducting wires by soldering.

Fig. 12 illustrates the entrance insulation of a conductor leading into a metallic casing of an electrolytic condenser. The sheet metal cover 46 of the casing is provided with an aperture accommodating a flanged bushing 50 of a suitable insulating material, for instance porcelain. The flange of this bushing bears upon the cover 46, a suitable washer 51 being interposed therebetween and is held in position thereon by a sheet metal ring 52 connected to the cover 46 by bolts. In order to protect the ceramic bushing 50 from mechanical injury, a suitable washer 51' of resilient material is interposed between the flange and the ring 52.

A conductor 47 passes through the bushing 50 and is sealed therein in accordance with my invention. For this purpose, the conductor 47 comprises a tube or rod of a suitable ceramic material, for instance of porcelain provided with a metal film 48 and a protective glaze covering. The axial boring of the bushing 50 is enlarged at the top and the enlargement is filled with a molten flux 49 of a suitable glaze uniting the bushing 50 with the glaze covering. The coefficient of thermal heat expansion of the flux 49 amounts preferably to 60-90 per cent of the coefficient of the porcelain of which the members 47 and 50 are made.

At the ends of the member 47 the metallic film is preferably left free from the protective glaze and is made thicker so that it will not be damaged by the attachment to the member 47 of a split ring 44 suitably clamped on the member 47 and attached to the wire 46'. A similar split ring not shown in Fig. 12 is attached to the upper end of member 47.

Fig. 13 illustrates a spark plug in which the passage of the central electrode through the insulating member 55 is sealed in accordance with my invention. The spark plug comprises an outer metallic sleeve designated by 60 as a whole. The lower end of this sleeve is threaded in the customary manner as indicated at 61, whereas the upper end 62 is of hexagonal cross-section to permit the engagement thereon of a wrench and is provided with an inner thread 63 permitting the insertion of a nut-ring 64 adapted to hold the insulating member 55 in place. The member 55 is provided with a shoulder 65 bearing against a washer positioned on an inner shoulder of the sleeve 60. Another washer is interposed between the ring-nut 64 and the insulating member 55.

Through the axial boring of the ceramic member 55, there passes a rod 57 consisting of the same ceramic material. The rod 57 is provided with a conductive film 58, for instance a metal film, and preferably with a protective glaze thereon. The axial boring of the member 55 is enlarged at the top and the space thus provided is filled with the fused flux as indicated at 59. A metallic terminal member 56 is suitably connected to the lower end of the rod 57. Any suitable connection may be used for this purpose. In the embodiment illustrated in Fig. 13, the member 56 is of larger diameter than the rod 57 and is provided with a boring into which the rod 57 is closely fitted. The end of the rod 57 extending into the member 56 is left free from the protective glaze. The rod 57 is provided with a diametrical boring registering with suitable openings in the member 56 and serving for the insertion of a rivet 66. A suitable electrode finger 67 cooperating with the member 56 is attached to the sleeve 60.

The upper end of rod 57 is shown as being of reduced diameter and as inserted in the axial boring of a bolt 68 and fixed therein by a transverse rivet 69. A nut 70 screwed on bolt 68 and bearing on a washer 71 placed on the top of the ceramic body 55 serves to transmit any thrusts which may be exerted on the bolt 68 directly to the ceramic body 55 to preserve the rod 57 from injury.

A clamping nut 72 provided on the bolt 68 permits the attachment of the ignition cable. The coefficient of heat expansion of the flux 59 should be 10–40 per cent lower than the coefficient of the ceramic member 55.

Sometimes, I prefer to first insert the conductor in a tube of a suitable inorganic insulating material of small diameter and to seal the same therein by a fusible flux using a gas flame for this purpose. Subsequently, one or more of such tubes including the sealed conductor are inserted in the apertures of the wall. Suitable flux material is then supplied to the gaps and the whole structure is then heated in an oven whereby the flux will unite the tubes with the wall. The wall may consist of the same inorganic insulating material as the tube or tubes or may consist of metal, as desired.

Figure 4:
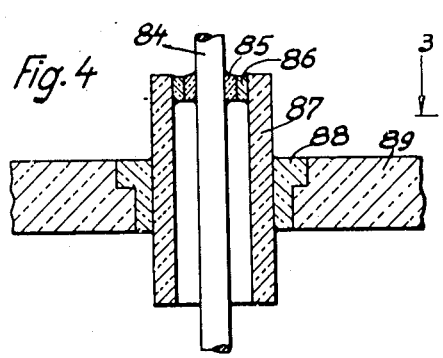
Fig. 4 illustrates partly in section an entrance insulation in which a plurality of layers of different thermal expansion are interposed between the conductor and the wall.

As pointed out above repeatedly, it is essential that the coefficient of thermal expansion of the flux materials should be less than that of the inorganic insulating materials by 10–40 per cent. If desired, a plurality of superimposed layers of fluxes having different coefficients of expansion may be interposed between the elements to be united, so that the coefficient will gradually vary from the innermost to the outermost layer. A product obtained by this process is illustrated in Fig. 4. The conductor 84 which may be a metal wire or rod or a ceramic carrier provided with a conductive film, for instance a metal film, passes through a tube 87 of Calit and is fixed therein by layers 85 and 86 of a suitable glaze. In order to reduce stresses due to thermal expansion or contraction to a minimum, I prefer to limit the axial dimension of the layers 85 and 86 as much as possible.

Preferably, the member 84 is first provided with the coat 85 of a suitable glaze having a relatively high melting temperature and then the coated member 84 is inserted in the tube and is heated in a gas flame while the flux 86 is applied which should melt at a temperature which is insufficient to liquefy the coat 85. Glazes having such melting points are well known in the art and, therefore, need not be specified in detail.

After the tube 87 and the conductor 84 have thus been united, the tube 87 is inserted in the aperture of the wall 89 which may also consist of Calit. The aperture is enlarged at the top to provide for a recess which is to be filled with a suitable flux in powder form. Thereupon the whole structure is brought into an oven and heated therein to a temperature at which the flux will melt and fill the gap completely, as shown at 88. The flux filling the gap should have a coefficient of heat expansion which is lower than that of Calit by 10–40 per cent.

Figure 5:
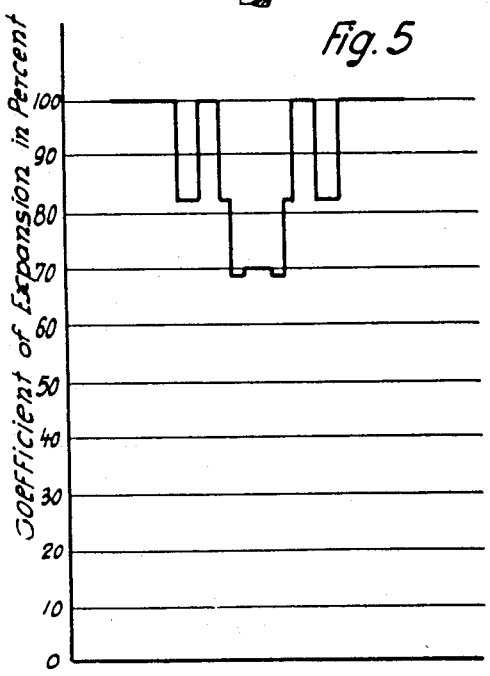
Fig. 5 is a diagram illustrating the relative coefficients of expansion of the layers shown in Fig. 4.

Fig. 5 shows a diagram illustrating the heat expansion properties of the different materials assuming that the tube 87 and the wall 89 consist of Calit having a coefficient of 100 per cent, while the conductor 84 is of metal having a considerably lower coefficient of heat expansion.

Fig. 6 illustrates this process applied to the base plate 89 of a vacuum discharge tube for high frequency purposes, the same reference numerals being inserted as in Fig. 4.

The performance of the process in two successive steps, the first step comprising the sealing of the conductors 84 in the tubes 87 and the second step the sealing of the tubes 87 in the wall 89, offers particular advantages if the wall 89 is comparatively thick or large and, therefore, should not be locally heated only as otherwise excessive stresses might result. It will be readily appreciated that there are no objections to a local heating of the thin tube 87 at its upper end and that, therefore, the conductor 84 may be easily sealed in the tube by means of a gas flame, whereas the sealing of the various tubes 87 in the wall 89 requires that this operation should be performed in an oven.

It is not absolutely necessary that the wall 89 to be united by the fusing process with the tube 87 enclosing the conductor 84 should consist of the same insulating material as this tube. I may make the wall 89 of some other inorganic insulating material or even of metal, although in the latter instance it is more difficult to reliably unite the wall with the tube because of the greater difference in the coefficients of thermal expansion.

In Fig. 7 I have illustrated a thin tube 93 made of Calit enclosing a conductor 90 similar to conductor 84 and consisting either of a metal rod or of an insulating carrier covered by a conductive film. The conductor 90 is secured and sealed in the wall 93 by the fused layers 91 and 92 of suitable composition. Similarly, the tube 93 is secured and sealed in the wall 96 consisting of porcelain by two layers 94 and 95 of a suitable compound. These compounds are so chosen that the coefficient of thermal expansion of the layer 94 is smaller, preferably 10–40 per cent less, than the coefficient of Calit amounting to $7.5 \times 10^{-6}$, whereas the coefficient of the layer 95 should be less than the coefficient of porcelain amounting to about $5 \times 10^{-6}$.

The selection of the compounds employed for the layers 91 and 92 is controlled by similar consideraltons.

In Fig. 8 I have diagrammatically indicated the relative coefficients of expansion compared with that of Calit. Thus, the conductor 90 has a coefficient amounting to 69 per cent of that of Calit, layer 91 68 per cent, layers 92 and 94 84 per cent, layer 95 53 per cent and wall 95 67 per cent of that of Calit.

Fig. 9 illustrates diagrammatically an example of a vacuum-proof electrode conductor entrance into a metal casing. The metallic electrode 107 consisting of molybdenum for instance is secured and sealed in a tube 100 consisting of a ceramic material, for instance Calit, by interposed fused layers 108 and 109. The tube 100 is inserted in a suitable aperture of the metallic wall 103 and the gap between the walls of this aperture and the tube 100 is filled by fused layers 101 and 102.

Fig. 10 shows diagrammatically the relative coefficients of thermal expansion, the expansion of the metal wall 103 being given as 100 per cent. The diagram shows that the coefficient of anyone of the layers 101, 102, 108, 109 is lower than the coefficient of the adjacent element 103, 100 or 107, preferably 10–40 per cent lower. Moreover, it will be noted that the coefficient of thermal expansion of the tube 100 lies intermediate the coefficients of the conductor 107 and of the wall 103.

The theory underlying my invention is based on the observation that a thin layer of a molten flux of an inorganic insulating material, such as glass fused in contact with slightly spaced surfaces, will not withstand mechanical stresses if the layer is subjected to tensional stresses. This is the reason why the coefficient of heat expansion of the layer should under no circumstances surpass that of the adjacent elements which are united by the layer. The coefficient of ceramic materials, however, will nearly always vary between certain limits. I have found for instance, that the coefficient of thermal expansion of Calit varies between $7.6 \times 10^{-4}$ and $7.8 \times 10^{-4}$. Theoretically, a satisfactory result could be attained if the coefficient of the flux layer would be the same as that of the ceramic element on which the layer is fused. Because of the unavoidable variations of the coefficient of the ceramic material, however, I prefer to select a flux material having a coefficient which is lower than that of the ceramic material.

These considerations will explain why a very slight difference less than 10 per cent between the coefficients is sufficient if the layer is fused on a metal body, such as wall 103 or the metallic conductor 107, having a very definite coefficient of thermal expansion which is not subject to variations, but may be predicted within very narrow limits. As shown in Fig. 10 for instance, the coefficient of the layer 102 is but 2 per cent lower than that of the metal of the wall 103.

The thickness of the sealing layers is illustrated on an exaggerated scale in all of the drawings. In practice, I have found that the gap that is left between the wall of the aperture and the element passing therethrough and that is to be filled with the fused flux, should have a width of approximately .006 inch. However, the gap may be varied within wide limits depending on the viscosity of the molten flux. The gap should be so wide that the molten flux will easily enter and yet should be sufficiently narrow to retain the molten flux by adhesion.

Moreover, I wish it to be clearly understood that the structures illustrated in the drawings are merely given by way of example and are not intended to limit the scope of my invention which is capable of numerous modifications.

What I claim is:—

1. The combination comprising an insulating element having an aperture, a carrier of ceramic insulating material passing therethrough, a conductive film on said carrier constituting a conductor for electrical energy passing through said element, and projecting therefrom at both sides thereof to form electrical contact terminals, and a flux filling the space between said carrier and said insulating element.

2. The combination comprising an insulating element having an aperture, a carrier of insulating material passing therethrough, a conductive film on said carrier and a flux filling the space between said carrier and said insulating element, and having a coefficient of thermal expansion lower than that of said element or said carrier.

3. In a discharge tube, the combination comprising a ceramic base plate having an aperture, a tube passing therethrough, said base plate and said tube being of an inorganic insulating material, conductive films on the inner and outer surface of said tube, and fluxes sealing the interior of said tube and the gap between the latter and said plate.

4. In a discharge tube, the combination comprising a base plate having an aperture, a plurality of tubes arranged in nested relation and passing through said aperture, said plate and said tubes being of a ceramic insulating material, conductive layers on said tubes and fluxes sealing the space within and between said tubes and said plate, the coefficient of thermal expansion of said fluxes being smaller than the coefficient of thermal expansion of said plate and said tubes.

5. The combination comprising a plate having an aperture, a tube of a ceramic material inserted in said aperture and sealed therein by a flux, a conductor passing through said tube, and a plurality of layers of different inorganic insulating materials including glass interposed between said conductor and said tube and fused in intimate contact with each other and with the conductor and with said tube.

6. The combination comprising an element having an aperture, a conductor passing through said aperture, and a plurality of superimposed layers sealing the gap between said conductor and said element, at least one of said layers consisting of a tube of a ceramic material and the other layers of a fused glass, the coefficient of thermal expansion of the layers of glass being lower than the coefficient of thermal expansion of the elements arranged in contact with said layers.

7. The combination comprising an insulating element having an aperture, a carrier of insulating material passing therethrough, a conductive film on said carrier and a flux filling the space between said carrier and said insulating element and having a coefficient of thermal expansion which is from 10 to 40 percent lower than that of said element or said carrier.

8. In a discharge tube, the combination comprising a ceramic base plate having an aperture, a tube passing therethrough, said base plate and said tube being of an inorganic insulating material, conductive films on the inner and outer surfaces of said tube, and fluxes sealing the interior of said tube and the gap between the latter and said plate, and having a coefficient of thermal expansion which is from 10 to 40 percent lower than that of said tube and said plate.

9. The combination comprising a plate having an aperture, a tube of a ceramic material inserted in said aperture a mass of flux having a lower melting point than said ceramic material and sealing said tube to said plate, a conductor passing through said tube and a seal of glass interposed between said conductor and said tube and fused in intimate contact therewith, the coefficient of thermal expansion of said flux and of said glass being from 10% to 40% lower than that of said plate and said tube.

HANS HANDREK.